Feb. 21, 1956 W. M. ROSS 2,735,999
ECHO SYSTEM FOR DETERMINING NATURE OF SEA BOTTOM
Original Filed Aug. 3, 1948 2 Sheets-Sheet 1
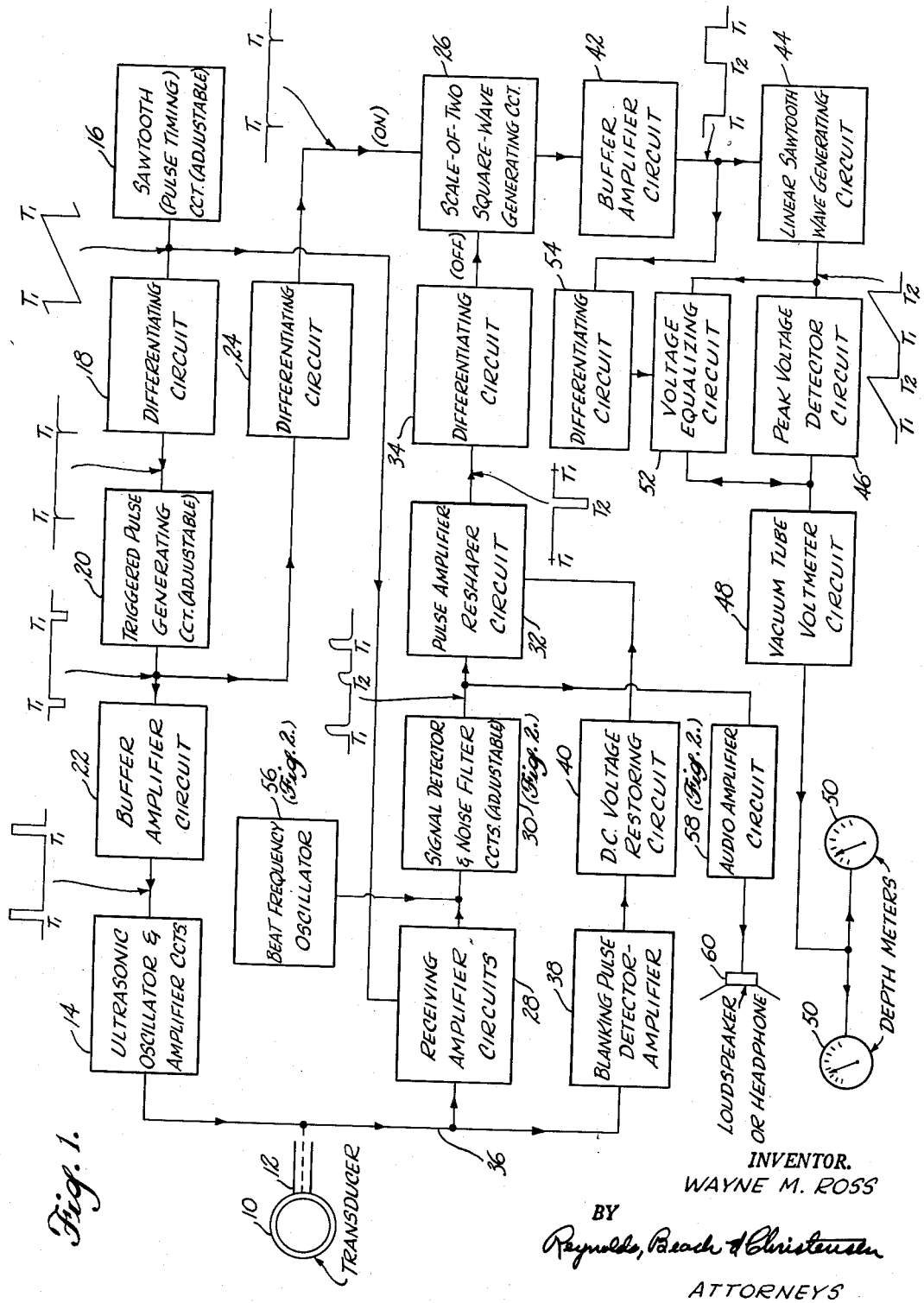
INVENTOR.
WAYNE M. ROSS
BY
Reynolds, Beach & Christensen
ATTORNEYS

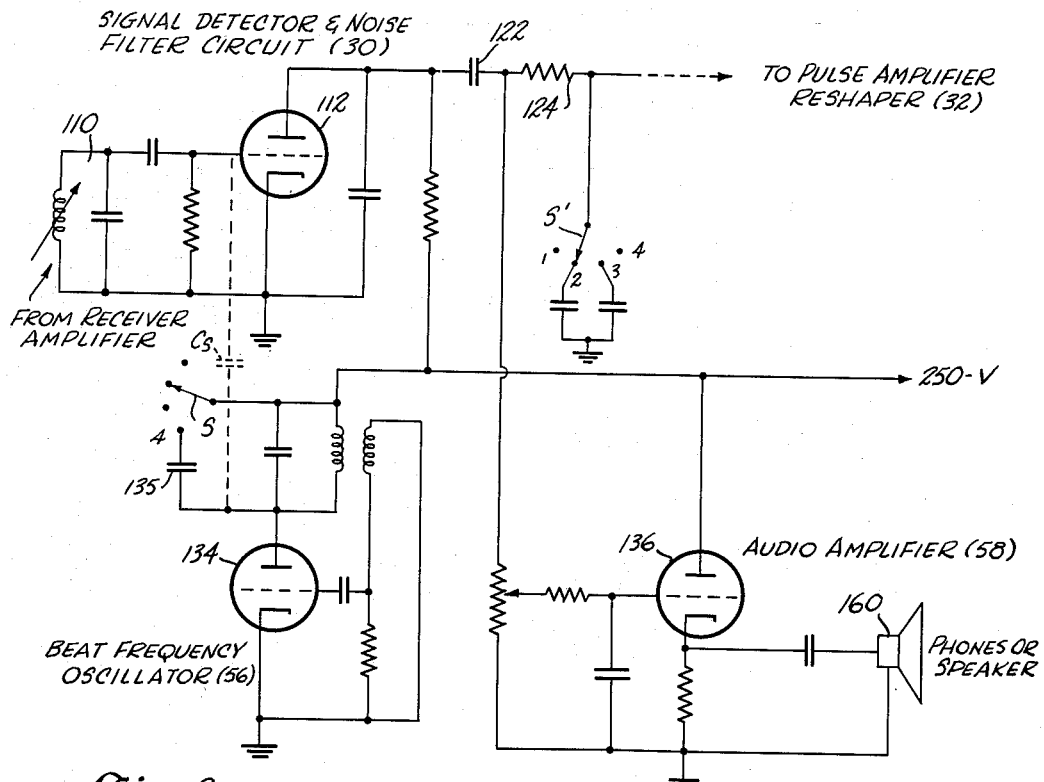

United States Patent Office 2,735,999
Patented Feb. 21, 1956

2,735,999
ECHO SYSTEM FOR DETERMINING NATURE OF SEA BOTTOM

Wayne M. Ross, Seattle, Wash., assignor to Minneapolis-Honeywell Regulator Company, Minneapolis, Minn., a corporation of Delaware Original application August 3, 1948, Serial No. 42,239, now Patent No. 2,599,586, dated June 10, 1952. Divided and this application February 16, 1952, Serial No. 271,961

4 Claims. (Cl. 340—3)

This invention relates to pulse-operated transmission-reception systems, and more particularly concerns a method and apparatus utilizing the received echo pulse energy in novel manner for enabling the identification of different types of reflecting objects or media, and for enabling the determination of certain characteristics thereof. The present invention is herein illustratively described by reference to the preferred form thereof as applied to the ultrasonic depth finder disclosed in my earlier-filed copending application Serial No. 42,239, filed August 3, 1948, and entitled Marine Depth Finder, now Patent No. 2,599,586, issued June 10, 1952, of which the present application is a division. However, it should be understood that certain detailed variations and modifications of the herein illustrated form may be made without departing from the underlying essentials involved, and without exceeding the scope of the appended claims directed thereto.

In a pulse-operated transmission-reception system of the ultrasonic type for underwater applications the high-frequency sound energy is propagated from the vessel in recurrent pulses, with a sufficient interval allowed between transmitted pulses to permit the return of all desired echoes to the apparatus following each transmitted pulse, before propagation of the next succeeding pulse takes place. The total out-and-back travel time of the sound energy propagating at the known speed of sound in water may be determined and indicated by suitable apparatus in any of various known ways, as a measure of the distance to particular reflecting objects. It thereby becomes readily possible to measure the depth of water beneath the vessel or the distance to a school of fish, for example. Such systems may be used for a variety of purposes, including but not limited to geodetic surveys, marine navigation, fishing, location of sunken vessels, and various military applications.

In conventional ultrasonic systems the information afforded by the apparatus has been limited primarily to the existence and location of reflecting objects detected within the energy propagation path. This information lends itself to display on the screen of a cathode ray tube, for example, in which the electron beam therein is swept across the face of the tube recurringly at system pulse repetition rate, the sweep speed representing velocity of the propagating ultrasonic energy, and the echo signal pulses being displayed as deflections lateral to the sweep line or as light spots produced by electron beam intensity modulations. Such information may also be displayed through less graphic means, such as galvanometers or the like. In some instances the system operator has been provided with ear phones, in order to warn him of the entry of a reflecting object into the range of the system. However, none of these methods lends itself readily to the determination of special characteristics of the media or objects producing the ultrasonic energy reflections. The cathode ray tube indicator, of all former methods comes nearest to that end, but requires visual observation and study, which at times may be inconvenient or impossible, depending on circumstances, as hereinafter explained.

An object of the present invention is the provision of a method and apparatus by which the nature or certain important characteristics of reflecting objects, especially the ocean bottom, may be readily determined from the echo signals in a highly convenient manner and without adding appreciably to the cost or complexity of an underwater sound system or the like. Moreover, the invention lends itself to incorporation in various former and other possible types of underwater pulse-operated ultrasonic systems, including the marine depth finder system disclosed in my above-cited copending application from which the present application is derived.

Another object is a method and apparatus of the type indicated, which is particularly suitable for small-vessel applications, such as fishing vessels, tug boats, and the like, wherein the small size of the crew normally requires that full responsibility for the navigation of the vessel be on the shoulders of one man, who must steer the vessel, observe the indicating instruments, and perform generally all functions related to navigation. In these circumstances it is highly inconvenient, if not impossible, for the navigator to keep an eye constantly on a cathode ray tube screen or other indicator, even if that indicator could provide all the information that is sometimes desired for fishing, navigation, or other purposes, as herein disclosed.

In accordance with the present invention the received echo signals passing through the receiver amplifier circuits are converted to a lower frequency within the range of audible sound frequencies, and are applied to a loud speaker or head phones to enable the operator to "listen" to the resultant signal-modulated tonal note sounds. The frequency reduction is accomplished in the illustrated case by means of a beat frequency oscillator tuned to a frequency different by some convenient amount, such as 1000 cycles per second, from that of the signal energy in a receiver amplifier stage, and passing the combined pulse signal energy and beat frequency oscillator energy through a mixer stage, whose output is coupled to the audio circuit for sound production. By thus imparting a tonal note to the echo signals in the receiver and listening to the resultant audio-frequency pulse tones, much can be learned of the reflecting objects. For example, the type of sound produced by reflections from the ocean bottom enables determining whether the bottom is soft and muddy, or is hard. In that way navigation may be aided, favorite fishing grounds located, or reflections from sunken vessels distinguished from bottom reflections in adjacent areas, etc. Also a school of fish beneath the vessel may be identified, and something learned of its nature and size by listening to the audible sounds produced in the loud speaker or head phones. This information cannot be obtained simply by "listening" to the received echo signals converted into D. C. impulses used for indication purposes in a conventional system, however, because only a dull thudding noise having no special characteristics distinguishable to the ear would be produced in that case.

These and other features, objects and advantages of the invention will become more fully evident from the following description thereof by reference to the accompanying drawings.

Figure 1 is a block diagram of the complete marine depth finder system in which the present invention is herein illustratively applied.

Figure 2 is a schematic circuit diagram of a portion of the system receiver and a suitable beat frequency oscillator and audio-amplifier circuit for converting the system echo signals into the desired audible sounds.

A more detailed disclosure of the marine depth finder system depicted in Figure 1 is given in my above-cited copending patent application. A sufficient description of the overall system is included in the present specification to serve as introduction and as background to the detailed description concerning the nature and operation of the present invention in its preferred form. It should be understood, however, that the method and apparatus comprising the present invention may vary as to certain details and may be applied in various other types of systems.

Other features of the system disclosed in said earlier-filed copending application are being disclosed and claimed in companion patent applications filed of even date with the present application, one such companion application being entitled Receiver Blanking Circuit for Pulse Transmission-Reception Systems, and the other, Pulse Timing and Receiver Automatic Gain Control in Pulse Object-Locating Systems.

In the figure, the ultrasonic transducer 10 may be of any conventional design adapted for installation at the bottom of a marine vessel. When the transducer is impressed with electric oscillations in the ultrasonic range, i. e. such as 25,000 cycles per second, ultrasonic energy is beamed toward the ocean bottom at the frequency of energization, and upon reflection at low energy level is converted by the transducer into an electric signal capable of amplification and utilization for purposes to be described. Because the associated electronic circuits are to be located at a different position on the vessel, the transmitted and received electrical energy pulses are conducted to and from the transducer through a shielded coaxial cable 12.

The transmitting channel of the system includes the ultrasonic oscillator and amplifier circuits 14, preferably of conventional design, periodically pulsed by a suitable modulation system including the sawtooth wave generating circuit or oscillator 16 controlling pulse timing, the differentiating circuit 18 or its equivalent converting the sharp transient trailing ends of the sawtooth waves into sharp or peaked trigger impulses, the modulating-pulse generating circuit 20 triggered at the sawtooth wave frequency by the output of the differentiating circuit 18, and the buffer amplifier circuit 22 directly modulating the ultrasonic oscillator with the amplified pulses. The wave-forms appearing at successive points in the transmitter channel are indicated in the figure, the symbol $T_1$ designating the start of each transmitted pulse. Circuits included in the blocks 14 and 22 are so conventional as to require no particular description or further illustration. Those represented by blocks 16, 18 and 20 may be of conventional form also.

The sawtooth wave timing circuit 16 is made adjustable to control pulse repetition frequency, and the triggered pulse generating circuit 20 is adjustable to control pulse length. Preferably longer pulses (15 milliseconds) are employed at the 200 fathom range and shorter pulses at shorter ranges, such as 10 millisecond pulses at 100 fathoms and 2.5 millisecond pulses at 20 fathoms. By varying the pulse length with range setting in this manner, maximum ratio of signal to noise in the system is more readily attainable by use of adjustable filter circuits in the receiving channel to filter out the random noise without seriously weakening the signal.

The faint electric signals produced in the transducer by the received echoes are amplified in circuits 28, and at resulting greater amplitude are applied to the circuits 30 comprising a signal detector and noise filter circuits. The detected signal impulses are then applied to the pulse amplifier and reshaper circuit 32 which increases their amplitude and restores a sharp or steep leading edge to the pulses partially removed by the process of detection and noise filtering. Such sharp leading edge of the detected pulse is further accentuated in point of time by the differentiating circuit 34 connected to trigger "off" the scale-of-two square wave generating circuit 26.

Modulating pulses generated by circuit 20 are likewise passed through a differentiating or peaking circuit 24 which converts the leading transient edges of each pulse to a sharp impulse of short duration. In this case the resulting sharp impulse is utilized to trigger "on" the square wave generating circuit. The scale-of-two circuit is sometimes referred to as a "flip-flop" circuit. Such a circuit is characterized by its initiation into one static state of operation by application of a first impulse to a control point, and of termination or return to its original state of operation by application to the same or a different control point in the circuit of a second impulse. The circuit is employed in the present instance to generate a voltage wave or pulse having steep leading and trailing edges coincident with the first and second applied pulses. Preferably the wave generated is of square or rectangular form, initiated with the transmitted pulse and terminated with the echo, each pulse cycle. The duration of this square wave therefore precisely equals the time of travel of ultrasonic energy from the vessel to and from the ocean bottom and constitutes a measure of ocean depth.

The square wave from the circuit 26 is utilized to measure and indicate ocean depth in the following manner. After passing through a buffer amplifier circuit 42, the square wave from the circuit 26 is applied to a linear sawtooth generating circuit 44. The latter produces a linearly rising voltage commencing at time $T_1$ and terminating at time $T_2$ when the echo is received. Since this rise in voltage is linear the resulting peak amplitudes of the sawtooth voltage waves from circuit 44 become directly proportional to ocean depth, and are detected by a peak voltage detector circuit 46 to produce a steady output voltage which can be read on a galvanometer or other indicator. However, instead of applying the output of peak detector 46 directly to a galvanometer, which would impair the detecting characteristic of the circuit 46 by providing a low impedance discharge path for the storage condenser of the peak detector, this steady voltage is applied first to a vacuum tube volt meter circuit 48 which in turn operates indicating meters 50. A continuous depth indication is thereby produced automatically, accurately and in simple manner, and any number of galvanometers or other indicators may be provided at convenient points throughout the vessel without appreciably adding to the cost.

A triggered voltage equalizing circuit 52 cooperates with the peak voltage detector 46 to enable the latter to respond sensitively to change in ocean depth no matter how rapid or in what sense they may incur. The voltage equalizing circuit is essentially a one-way switch, triggered or initiated into operation momentarily at time $T_2$, at the end of each sawtooth wave from circuit 44, by a sharp impulses from the differentiating circuit 54 which peaks the transient trailing end of the square wave produced by circuit 26. In a sense, this circuit "compares" at time $T_2$ the instantaneous peak amplitude the sawtooth voltage with the existing voltage of the charge stored by the condenser in the peak voltage detector circuit 46. It will be evident that the latter is capable of gaining a higher voltage simply by the process of conduction of its detector means, adding charge to the condenser when ocean depth increases and the sawtooth wave peaks rise accordingly above their former value and the steady condenser voltage of the detector circuit. It is likewise important that the condenser retain its charge between sawtooth peaks if its voltage is to be sufficiently steady to prevent flicker of the indicator meters 50. The difficulty, therefore, lay in the condenser being enabled to lose its charge sufficiently rapidly to maintain its voltage accurately representative of depth should the ocean depth suddenly decrease. The voltage equalizing circuit 52, which "compares" voltages as mentioned, overcomes this difficulty by removing excess charge from the condenser, if necessary, each pulse cycle to prevent discharge of the condenser lagging behind a drop in sawtooth wave peak amplitudes. The arrangement thereby permits the use of a peak detector circuit with a high time-constant or filter-factor, capable of producing a steady and accurate meter deflection.

Another problem encountered results from the pulses of high intensity ultrasonic oscillations from the oscillator 14 entering the receiving circuits 28 over the same circuit conductor 36 as the faint received echo signals from the transducer, tending to overload the amplifier circuits. A simple addition to these circuits as described overcomes the difficulty with vacuum tube overload, but there remains the more serious problem of the transmitted pulse, at substantial intensity, passing the circuit stages 30, 32 and 34 and reaching the scale-of-two circuit 26. If allowed to reach the circuit 26 this pulse would arrive at an appreciable, though slight, time after the circuit is triggered "on" by the differentiating circuit 24, because of the inherent delay encountered in the receiver channel, and because of circuit transient and spurious echoes immediately following the transmitted pulse, and would tend to trigger "off" the circuit 26 at the wrong time, before reception of the echo, a condition obviously unfavorable. To completely avoid any such possibility I prefer to eliminate the transmitted pulse from the receiver channel at the stage of amplifier 32, by deriving a blanking pulse coexistent with or overlapping all portions of the transmitted pulse in the receiver, and applying it as a blocking bias to such amplifier. As indicated by the wave form shown in the figure, the transmitted pulse occurring at time $T_1$ and an echo signal at time $T_2$ arbitrarily chosen are both allowed to pass detector 30, however.

Following application of each blanking pulse, it is desirable to allow immediate recovery of circuit sensitivity. A D. C. restorer circuit 40 interposed between the detector amplifier circuit 38 and amplifier 32 performs this function.

It will be evident that echo signals are much stronger in shallow water than in deep water because of divergence or spread of the transmitted ultrasonic beam, and thereby the reduced sound intensity impinging a unit area of the ocean bottom at greater depths, and also because of the divergence of the reflections. Ordinarily, therefore, the signals from shallows are much stronger than required to operate the sensitive electronic receiving circuits, while those from the greater depths may be so faint as to require maximum receiving sensitivity. It will then be immediately evident that a receiver which equally amplifies echo signals from all depths will tax the capacity of any measuring circuits to respond similarly to the signals which occur at the widely divergent intensities, a condition which is naturally undesirable. Moreover, when listening to the signal sounds it will be more difficult to recognize the identifying signal characteristics if this intensity variation is great. The problem is overcome in simple, effective manner by directly utilizing the sawtooth voltage waves already available from the sawtooth timing circuit 16 and applying such waves as cyclic automatic volume control voltage to the receiving amplifier circuits 28, as indicated in Figure 1. Accordingly, the applied progressively rising sawtooth voltage occurring during each pulse cycle, commencing immediately with the transmission of a pulse and ending with the transmission of the succeeding pulse, progressively raises the gain of the receiver during that interval so that signals in shallow water are amplified less than signals in deep water, generally proportionately. Consequently, no manual control is necessary to adjust detected signal intensity throughout the full operating range of the apparatus, and even if sawtooth frequency is changed with range adjustment, the control is unchanged.

In accordance with the present invention a beat frequency oscillator circuit 56 is provided (Figure 1) in order to reduce the frequency of the signals in the receiver to a desired audible-sound frequency. As indicated in the block diagram, the received echo pulse signals and the continuous-wave output of the beat frequency oscillator 56 are mixed together in the detector 30, and the resulting audio-frequency pulse energy from the detector is then amplified in the audio-amplifier circuit 58 for application to a loud speaker 160 or head phones. From the nature of the audible signal tones thus produced the operator is enabled to recognize the presence of schools of fish in the water, or to determine the relative softness of the ocean bottom, or to establish other characteristics of the reflecting media. Experience with the apparatus teaches that the recurring tonal sounds become quite staccato or sharp when the reflecting ocean bottom is hard, for example, and become slurred or legato with a soft ocean bottom. Thus the method enables identifying favorite fishing grounds, navigating along certain channels, or charting geodetic features of the bottom, among numerous other possibilities. The presence of a school of fish is heard as a periodic rushing tonal sound of a duration determined by the density and dimension of the school in the direction of ultrasonic propagation. The presence of a submarine or other singular localized object at a distance is "heard" as a relatively short and clipped pulse tone.

In the illustrated case the pulse repetition rate is set at approximately fifty cycles per minute when the apparatus is switched over to operate in accordance with the present method. At this low repetition rate it becomes readily possible to listen for the lapsed time interval between pulse transmission and subsequent echo pulse reception, and especially at the greater depths, up to approximately four hundred fathoms, the operator can learn to gauge by ear the approximate depth of the water from the length of that interval. This can be of particular value when navigating in the dark under conditions in which all lights should be out to avoid impairing the pilot's vision.

In Figure 2, position No. 4 of the switch S represents the setting in which the system is conditioned for low-frequency operation and for listening to the sounds of the converted echo signals. When this switching takes place the capacitance of the tuned plate circuit of the beat frequency oscillator tube 134 is increased by the capacitance of the condenser 135, which lowers the oscillator frequency to a point whereat it differs from the echo signal frequency in the tuned input circuit 110 of the detector tube 112 by the desired audio tone frequency. If, for example, the ultrasonic frequency of the signals in the input circuit 110 is 25,000 cycles per second, the beat frequency oscillator may be tuned to a nearby frequency, such as 24,000 or 26,000 cycles per second, to produce a 1,000 cycle per second signal tone frequency which is readily heard and does not become tiresome to the ear.

The beat frequency oscillator 56, including the vacuum tube 134, is of a conventional tuned-plate type, requiring no particular description herein, although it will be obvious that any suitable type of oscillator may be used for the purpose. The oscillations generated in it may be coupled either directly or indirectly, as by stray capacitance $C_s$, to the input of detector tube 112, in order to produce the desired audio-frequency signals at the output of the detector tube. These audio-frequency energy pulses pass through the coupling condenser 122 to the control grid of the audio-amplifier tube 136 for application to the loud speaker 160.

As previously implied herein, some of the transmitted pulse energy passing directly into the receiver channel reaches the detector tube 112 and the audio-amplifier tube 136, so that the transmitted pulse is also heard in the loud speaker. This enables the operator to gauge depth approximately by listening for the lapsed time interval between the transmitted pulse and ensuing echo signal.

The isolating resistor 124 interposed between the pulse amplifier reshaper 32 (not shown in Figure 2) and the output side of the detector 112 prevents blanking pulse energy applied to the input of the pulse amplifier reshaper 32 from completely suppressing or eliminating transmitted pulse energy at the input of the audio amplifier 58. The presence of resistor 124 reduces the intensity of the blanking pulse as applied to the control grid of tube 136 so that the transmitted pulse is heard in the head phones or loud speaker, but not so loudly as to contrast excessively with the volume of the subsequently received echo pulses. The latter are thereby more readily heard and distinguished.

Preferably the beat frequency oscillator 56 functions continuously as an alternating current generator from which bias voltages for different parts of the system are derived. The details of a circuit for converting the high-frequency oscillations of the beat frequency oscillator in its two different operating conditions represented, respectively, by position 4 and the remaining three positions of switch S may be conventional and are not shown in the drawings. The frequency of the oscillator 56 in these other three switch positions is sufficiently in excess of that of the signal energy in the detector input circuit 110, that no audible tone is then produced in loudspeaker 160 at such times.

Switch S', coordinated with switch S, enables connecting different by-pass condensers 126' and 126" across the output of the detector tube 112 to serve as integrating noise filters. These filter condensers eliminate much of the interference or background signals which would otherwise reach the pulse amplifier reshaper 32. When operating the system at a high pulse repetition rate, shorter transmitted pulses are optimum for greatest overall signal-to-noise ratio in the system, whereas longer pulses are desirable as the pulse interval is increased. The optimum capacitance of the filter condenser selected by switch S', taking maximum advantage of this relationship, varies with the pulse length and is selected automatically to correspond thereto when the system is switched over from one pulse rate to another, as explained more fully in the above-cited copending application.

I claim as my invention:

1. The method of detecting characteristics of the ocean bottom and of other reflecting media in the path of energy propagation of an underwater ultrasonic transmission-reception system, said method comprising the steps of periodically transmitting pulses of ultrasonic wave energy of predetermined energy frequency directly downwards toward the ocean bottom from a transmitting station, said wave energy pulses being short relative to the period between successive pulses, receiving the energy reflections at said station to produce electrical wave energy signals therefrom of predetermined frequency, generating a continuous-wave beat frequency signal of a substantially constant frequency differing by an audio frequency from said predetermined frequency at said station, mixing said continuous-wave beat frequency signal with said wave energy signals to produce electrical signals at said audio frequency, and converting said audio-frequency electrical signals into corresponding sound energy, whereby periodically recurrent pulses of sound are produced having an audible tonal characteristic and having a duration and character determined by the nature of the ocean bottom or other reflecting medium in the downwardly directed path of wave energy transmission.

2. The method of detecting characteristics of the ocean bottom and of other reflecting media in the path of energy propagation of an underwater ultrasonic transmission-reception system, said method comprising the steps of periodically transmitting pulses of ultrasonic wave energy of predetermined energy frequency directly downward toward the ocean bottom from a transmitting station, said wave energy pulses being short relative to the period between successive pulses, receiving the energy reflections and also a portion of the directly transmitted energy at said station to produce electrical wave energy signals therefrom of predetermined frequency, generating a continuous-wave beat frequency signal of a substantionally constant frequency differing by an audio frequency from said predetermined frequency at said station, mixing said continuous-wave beat frequency signal with said wave energy signals to produce electrical signals at said audio frequency, and converting said audio-frequency electrical signals into corresponding sound energy, whereby two sets of periodical pulses of sound are produced having an audio tonal characteristic, one set representing said directly transmitted energy pulses and the other set representing said reflected energy pulses occurring alternately therewith and having a duration and character differing from the pulses of said first set according to the nature of the ocean bottom or other reflecting medium in the downwardly directed path of wave energy transmission.

3. An underwater ultrasonic pulse transmission-reception depth sounding system comprising downwardly directed transducer means to transmit ultrasonic energy impulses recurringly at a predetermined repetition rate toward the ocean bottom, means to receive directly a portion of the energy of said transmitted pulses as well as returning echo pulse ultrasonic energy reflected from the ocean bottom, local oscillator means operable to generate continuous-wave energy at a substantially constant frequency differing by an audio frequency from the frequency of said transmitted pulse energy portion and of said echo pulse in the receiver means, mixer means energized by such generated wave energy and by such directly received and echo pulse energies in the receiver means for converting said directly received and echo pulse energies into audio-frequency electrical energy, and audio-frequency sound producing means energized by the output of said mixer means to produce sound impulses representing both the directly received impulses and also the echo impulses, both having a tonal characteristic determined by said audio frequency, said echo pulse energy sounds differing from the directly received pulse energy sounds according to the nature of the reflecting ocean bottom.

4. An underwater ultrasonic pulse transmission-reception depth sounding system comprising downwardly directed transducer means to transmit ultrasonic energy impulses recurringly at a predetermined repetition rate toward the ocean bottom, means to receive returning echo pulse ultrasonic energy reflected from such ocean bottom, oscillator means to generate a wave frequency differing from that of echo pulse energy in the receiver means by an audio frequency, mixer means energized by such generated wave energy and such echo pulse energy for converting the latter into audio-frequency echo pulse energy, and audio-frequency sound producing means energized by the output of said mixer means to produce sound impulses having a tonal note characteristic of the audio frequency and from which certain information concerning the nature of the ocean bottom producing the echo may be learned by listening to such sounds.

References Cited in the file of this patent

UNITED STATES PATENTS

| | | |
|---|---|---|
| 2,400,796 | Watts | May 21, 1946 |
| 2,431,854 | Wood | Dec. 2, 1947 |
| 2,566,858 | Sebring | Sept. 4, 1951 |